United States Patent [19]

Horikawa

[11] Patent Number: 4,690,629
[45] Date of Patent: Sep. 1, 1987

[54] INJECTION MOLDING MACHINE FOR SMALL-SIZED ARTICLES

[75] Inventor: Yoichi Horikawa, Kurobe, Japan

[73] Assignee: Yoshida Kogyo K. K., Tokyo, Japan

[21] Appl. No.: 876,275

[22] Filed: Jun. 19, 1986

[30] Foreign Application Priority Data

Jun. 19, 1985 [JP] Japan .................. 60-131643

[51] Int. Cl.⁴ .................. B29C 45/02; B29C 45/70
[52] U.S. Cl. .................. 425/156; 264/40.3; 264/40.5; 264/328.4; 264/328.11; 425/157; 425/159; 425/557; 425/591
[58] Field of Search .................. 425/135, 145, 146, 147, 425/156, 157, 159, 544, 545, 557, 591, 595; 264/40.3, 40.5, 40.7, 328.11, 328.4

[56] References Cited

U.S. PATENT DOCUMENTS

| | | | |
|---|---|---|---|
| 2,478,013 | 8/1949 | Roddy | 425/135 |
| 2,568,042 | 9/1951 | Vltavsky | 425/591 |
| 2,671,246 | 3/1954 | Lester | 425/157 |
| 2,804,752 | 9/1957 | Norman et al. | 425/591 |

Primary Examiner—Jay H. Woo
Assistant Examiner—Timothy W. Heitbrink
Attorney, Agent, or Firm—Hill, Van Santen, Steadman & Simpson

[57] ABSTRACT

An injection molding machine for small-sized articles of thermoplastic synthetic resin comprises a hydraulically pressurizable injection head cylinder operable on an injection cylinder of an injection unit for injecting molding material into a mold, a hydraulically pressurizable clamping cylinder operable on one of a pair of mold members of the mold for opening and closing the mold, and a booster operatively connected to both the injection head cylinder and the clamping cylinder for converting pneumatic pressure into high hydraulic pressure to actuate the two cylinders in timed relation to each other.

6 Claims, 3 Drawing Figures

INJECTION MOLDING MACHINE FOR SMALL-SIZED ARTICLES

BACKGROUND OF THE INVENTION

1. Field of the Invention

The present invention relates to an injection molding machine which is suitable for injection molding relatively small articles, such as top or bottom stops of a slide fastener, buttons and buckles.

2. Description of the Prior Art

In some of conventional injection molding machines of the described type, an injection head cylinder and a clamping cylinder are operable by means of oil pressure, while in the other conventional injection molding machines, such actuator cylinders are operable by means of air pressure.

With the hydraulic actuator cylinders, because of their relatively high pressure, it is possible to smoothly inject molding material into the mold. However, the hydraulic cylinders are not suitable to on an injection molding machine for forming relatively small articles, since an oil pump, an oil tank, an oil cooler, and various other apparatus for regulating oil pressure are required, which would necessarily make the entire machine large in size.

On the other hand, the pneumatic actuator cylinders require only an air compressor, which would make the entire molding machine compact in size. However, because of the low pressure by the pneumatic actuator cylinders, it is necessary to enlarge the sprue and runner in the mold in order to facilitate the pouring of molten molding material into the mold. As a result, it takes a longer time to cool the molten molding material into a solid form, thus reducing the speed of molding. Further, enlargement of the sprue and runner increases the cost of molding material.

SUMMARY OF THE INVENTION

It is therefore an object of the present invention to provide a machine for injection molding small-sized articles of thermoplastic synthetic resin in which machine molding material can be injected into the mold smoothly in spite of using air pressure as a power source.

According to the present invention, an injection molding machine for small-sized articles of thermoplastic synthetic resin comprises a hydraulically pressurizable injection head cylinder operable on an injection cylinder of an injection unit for injecting molding material into a mold, a hydraulically pressurizable clamping cylinder operable on one of a pair of mold members of the mold for opening and closing the mold, and a booster operatively connected to both the injection head cylinder and the clamping cylinder for converting pneumatic pressure into high hydraulic pressure to actuate the two cylinders in timed relation to each other.

Many other advantages, features and additional objects of the present invention will become manifest to those versed in the art upon making reference to the detailed description and the accompanying drawings in which a preferred embodiment incorporating the principles of the present invention is shown by way of illustrative example.

DETAILED DESCRIPTION

Figure 1:
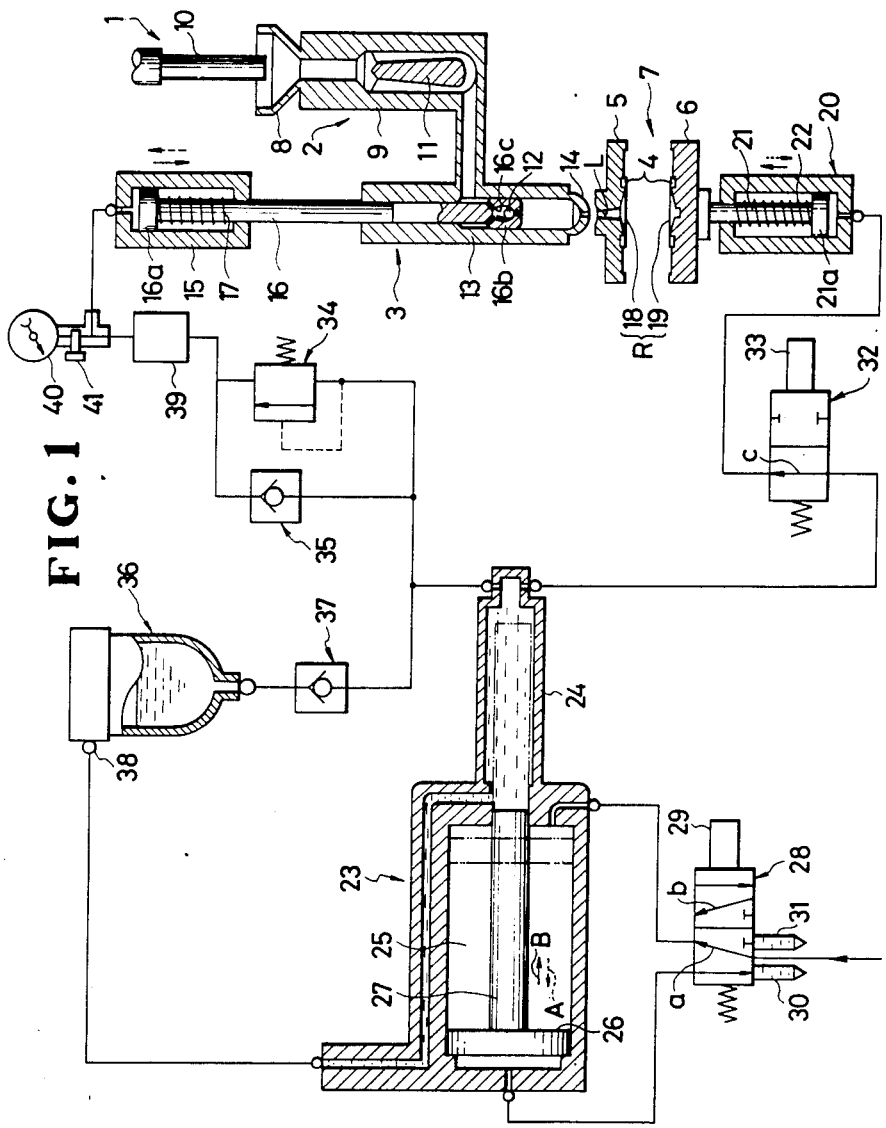
FIG. 1 is a schematic cross-sectional view of an injection molding machine embodying the present invention.

FIG. 1 shows an injection molding machine (hereinafter referred to as "molding machine") for forming small-sized articles of thermoplastic synthetic resin. In the illustrated example, a pair of top stops S (FIG. 3) of a slide fastener is formed on a pair of stringer tapes T, T, respectively, (FIGS. 2 and 3) by the molding machine.

The molding machine comprises a mold 7 supported on a support (not shown) and including a pair of first and second (upper and lower) mold members 5, 6 defining a pair of mold cavities 4, 4 therebetween, and an injection unit 1 for injecting molding material of molten thermoplastic synthetic resin into the mold cavities 4, 4 through a sprue L and a runner R extending between the sprue L and the mold cavities 4, 4. The runner R is composed of an upper runner-forming channel 18 in the first mold member 5 and a lower runner-forming channel 19 in the second mold member 6. Each of the mold cavities 4 has a contour corresponding to the shape of a single top stop S (FIG. 3) to be molded.

The injection unit 1 includes a material supply cylinder 2 and an injection cylinder 3. The material supply cylinder 2 has a hopper 8 and a first tubular heating chamber 9 disposed below the hopper 8. In use, an amount of thermoplastic synthetic resin loaded in the hopper 8 is forced into the first heating chamber 9 by a vertically reciprocable plunger 10 connected to a suitable drive (not shown). In the first heating chamber 9, the molding material is heated into a molten state. A torpedo 11 is disposed in a borehole of the first heating chamber 9 to reduce the volume thereof and hence serves to assist in melting the molding material.

The injection cylinder 3 has a second tubular heating chamber 13 communicating with the first heating chamber 9 for receiving the molten molding material therefrom, and an injection nozzle 14 disposed contiguous to the lower end of the second heating chamber 13.

A hydraulically pressurizable injection head cylinder 15 is supported on the non-illustrated support at a position above the injection cylinder 3 and has a first piston 16a reciprocable in the injection head cylinder 15 and a first piston rod 16 extending from the first piston 16a. The first piston rod 16 projects downwardly from the second heating chamber 13 into the second heating chamber 13 and terminating in an enlarged portion 16b disposed in an enlarged borehole of the second heating chamber 13.

The enlarged portion 16b serves as a piston reciprocable in the second heating chamber 13, in response to the reciprocating movement of the first piston 16a, for forcing the molten molding material from the second heating chamber 13 into the mold 7 through the injection nozzle 14. The enlarged portion 16b has a central cavity 16c within which a check ball 12 is vertically movably received, the cavity 16c opening to both upper and lower portions of the borehole of the second heating chamber 13. In response to the vertical upward movement of the first piston rod 16, the check ball 12 is moved vertically in the cavity 16c for allowing the molten molding material in the first heating chamber 9 to flow into the lower portion of the borehole of the second heating chamber 13 through the cavity 16c and later for preventing this flowing of the molten molding material.

When the first piston rod 16 is moved downwardly, flow of the molten molding material from the first heating chamber 9 into the second heating chamber 13 is halted, and at the same time, the molten molding material existing in the second heating chamber 13 is forced out therefrom through the injection nozzle 14. Reversely, when the first piston rod 16 is moved upwardly, the molten molding material from the first heating chamber 9 flows into the lower portion of the borehole of the second heating chamber 13.

The first piston 16a and hence the first piston rod 16 are normally urged upwardly by a first compression spring 17 received in the bore of the injection head cylinder 15, and are movable downwardly against the bias of the first compression spring 17 when the injection head cylinder 15 is hydraulically pressurized in a manner described below. In the absence of the inlet oil pressure, the first piston 16a is moved upwardly under the bias of the first compression spring 17 for causing the oil to be discharged from the injection head cylinder 15. The injection cylinder 3, together with the material supply cylinder 2, is vertically movable by a suitable means (not shown) so as to bring the injection nozzle 14 in contact with the first (upper) mold member 5.

The second (lower) mold member 6 is vertically movable toward and away from the first (upper) mold member 5 by a clamping cylinder 20 supported on the non-illustrated support at a position below the second mold member 6. The clamping cylinder 20 has a second piston 21a reciprocable therein and a second piston rod 21 extending from the second piston 21a. The second piston rod 21 projects upwardly from the clamping cylinder 20 and terminates in an upper end on which the second (lower) mold member 6 is mounted.

Figure 2:
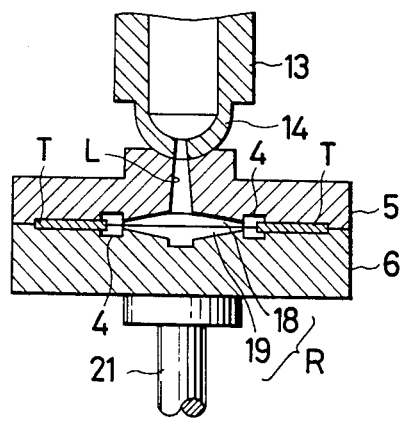
FIG. 2 is a fragmentary enlarged cross-sectional view of FIG. 1, showing the manner in which top stops are molded on a slide fastener chain.
Figure 3:
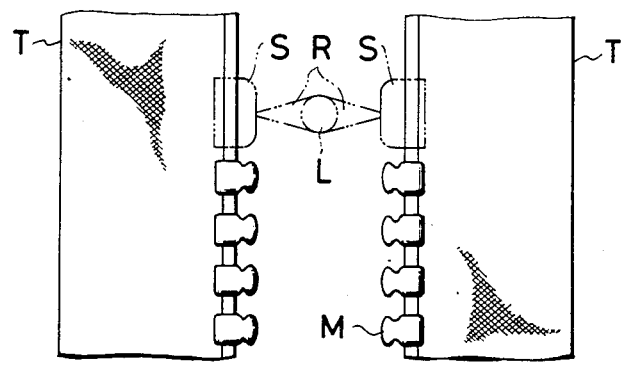
FIG. 3 is a fragmentary enlarged plan view of the slide fastener chain on which the top stops are to be molded by the present molding machine.

The second piston 21a and hence the piston rod 21 are normally urged downwardly by a second compression spring 22 received in the borehole of the clamping cylinder 20, and are movable upwardly against the bias of the second compression spring 22 when the clamping cylinder 20 is hydraulically pressurized in a manner described below. In the absence of the oil pressure, the second piston 21 is lowered under the bias of the second compression spring 22 for causing the oil to be discharged from the clamping cylinder 20. When the second piston rod 21 is moved upwardly, the second (lower) mold member 6 is coupled with the first (upper) mold member 5, as shown in FIG. 2, to thereby provide between the two mold members 5, 6 the pair of mold cavities 4, 4 for forming the pair of top stops S, S. With the first and second mold members 5, 6 maintained in coupled position, when the first piston rod 16 of the injection head cylinder 15 is lowered, the molten molding material is injected from the injection nozzle 14 into the mold cavities 4, 4 in the mold 7 via the sprue L and the runner R.

As shown in FIG. 2, a pair of stringer tapes T, T is sandwiched between the first and second mold members 5, 6, with an inner longitudinal edge of each tape T projecting into the respective mold cavity 4, so that a top stop S is formed directly on each inner tape edge.

Most importantly, the molding machine has a booster 23 operatively connected to the injection head cylinder 15 and th clamping cylinder 20 for hydraulically pressurizing these two cylinders 15, 20 in timed relation to each other. The booster 23 has a function of converting an air pressure into a high oil pressure.

The booster 23 includes a double acting pneumatic cylinder 25 in which a larger-diameter piston 26 is reciprocable under air pressure, and a hydraulic intensifier cylinder 24 in which oil is contained and into which a smaller-diameter piston 27 extending integrally from the larger-diameter piston 26 is reciprocable in response to the reciprocating movement of the larger-diameter piston 26.

When the larger-diameter piston 26 is moved from the solid line position to the phantom line position in FIG. 1 under the air pressure, the smaller-diameter piston 27 is moved rightwardly to project into the oil-containing intensifier cylinder 26. At that time, from the following equation:

$$\text{air pressure } p \times \text{area of larger-diameter piston 26} = $$
$$\text{oil pressure } P \times \text{area of smaller-diameter intensifier piston 27,}$$

and since the area of the larger-diameter piston 26 is larger than the area of the smaller-diameter piston 27, the oil pressure P is greater than the air pressure p.

The pneumatic cylinder 25 of the booster 23 is operatively connected to a four-direction magnetic valve (hereinafter referred to (also known as a magnetically actuated, 4-way, spring return, pneumatic valve) as "first magnetic valve") 28 for converting flow-in of the pressurized air to flow-out thereof and vice versa by the action of a solenoid 29. With the first magnetic valve 28 in the position shown in FIG. 1, the pressurized air flows in the direction of an arrow a into the pneumatic cylinder 25 so as to move the larger-diameter piston 26 in the direction of an arrow A. When the magnetic valve 28 is reversed by the action of the solenoid 29, the pressurized air flows in the direction of an arrow b so as to move the larger-diameter piston 26 in the direction of an arrow B. The first magnetic valve 28 has a pair of silencers or mufflers 30, 31 for deadening the noise of the air discharged from the pneumatic cylinder 25.

The intensifier cylinder 24 of the booster 23 is operatively connected to a two-direction magnetic valve (hereinafter referred to as "second magnetic valve") (also known as a normally open, spring biased, magnetic solenoid, hydraulic valve) 32 which is in turn connected to the clamping cylinder 20 for converting flow-in of the pressurized oil (from the intensifier cylinder 24 into the clamping cylinder) to flow-in stoppage thereof and vice versa by the action of a solenoid 33. With the second magnetic valve 32 in the position shown in FIG. 1, the oil pressurized to a high value by the booster 23 flows out from the intensifier cylinder 24 in the direction of an arrow c (through the second magnetic valve 32) into the clamping cylinder 20. This flow-in causes the second piston 21a to move upwardly against the bias of the second compression spring 22, thus closing the mold 7. When the second magnetic valve 32 is reversed by the action of the solenoid 33, flow-in of the pressurized oil is terminated, and pressurized oil is trapped downstream of the valve 32.

In the state illustrated is FIG. 1, when intensifying the oil pressure by the booster 23 is terminated and the valve 32 is deactivated, the second piston 21a of the clamping cylinder 20 is lowered under the bias of the second compression spring 22 to cause the pressurized oil to flow in the reverse direction.

A pressure regulating valve 34 is operatively connected at one end to the intensifier cylinder 24 and at the other end to the injection head cylinder 15 via a regulating or reducing valve 39 and a pressure gauge 40. The pressure regulating valve 34 is operable only when a back pressure is developed. At its inlet with the pressure regulating valve 34 in the position shown in FIG. 1, the oil pressurized to a high value by the booster 23 cannot flow into the injection head cylinder 15 so that first the clamping cylinder 20 is filled with the pressurized oil to raise the second mold member 6 toward the first mold member 5. When the second mold member 6 is thus brought in contact with the first mold member 5, a back pressure of the pressurized oil is developed which acts on the pressure regulating valve 34 to allow the pressurized oil from the intensifier cylinder 24 of the booster 23 to flow into the injection head cylinder 15. Thus the injection head cylinder 15 is operable after the mold 7 has been completely closed.

A first check valve 35 is connected to the opposite ends of the pressure regulating valve 34 in parallel relation thereto. Upon completion of the injecting operation of the injection head cylinder 15, the first piston rod 16 is raised under the bias of the first compression spring 17 to cause the pressurized oil in the injection head cylinder 15 to be discharged via the first check valve 35. While the pressure of the pressurized oil between the intensifier cylinder 24 of the booster 23 and the pressure regulating valve 34 is high, the pressurized oil at the first check valve 35 cannot flow in the reverse direction. Therefore, the high-pressure oil from the intensifier cylinder 24 of the booster 23 can adequately flow to the injection head cylinder 15.

In order to cope with fluctuation of oil volume in this regulating circuit, an oil pot 36 is connected to the booster 23 for storing a suitable amount of oil. A second check valve 37 is mounted between the oil pot 36 and the booster 25. When the smaller-diameter piston 27 is moved in the direction of the arrow A, the amount of the pressurized oil in the intensifier cylinder 24 is temporarily reduced, and then an amount of oil can flow from the oil pot 36 into the intensifier cylinder 24 via the second check valve 37. While the oil between the second check valve 37 and the booster 23 is under high pressure, flow-in of the oil from the oil pot 36 is halted.

As mentioned above, after the mold 7 has been completely closed, and the valve 32 opened the oil flows from the clamping cylinder 20 back to the booster 23 via the second magnetic valve 32 to fill the intensifier cylinder 24, and then any excessive oil flows through an oil inlet 38 into the oil pot for storage therein.

The regulating valve 39 is a conventional type which serves to control the injection pressure in the injection cylinder 13. The pressure gauge 40 also is a conventional type with which the injection pressure can be indicated as a cock 41 associated with the gauge 41 is opened for temporary inspection and then closed.

The molding machine thus constructed operates as follows. Prior to the start of operation, with the first and second mold members 5, 6 of the mold 7 vertically separated, the injection cylinder 3 is filled with molten molding material from the material supply cylinder 2. In the booster 23, meanwhile, both the larger-diameter piston 26 and the smaller-diameter intensifier piston 27 are in retracted position indicated in solid lines in FIG. 1, the intensifier cylinder 24 being filled with oil. The first magnetic valve 28, the second magnetic valve 32, and the pressure regulating valve 34 are in their respective positions illustrated in FIG. 1.

A pair of stringer tapes T, T is placed between the first and second mold members 5, 6, with the inner longitudinal tape edges projecting into the respective mold cavities 4,4, and then the solenoid 29 of the first pneumatic magnetic valve 28 is energized by a suitable switch (not shown).

Upon energization of the solenoid 29, the flow of the pressurized air is used to move the largerdiameter piston 26, together with the smaller-diameter intensifier piston 27, in the direction of the arrow B to the phantom-line position. As a result, the oil thus pressurized to a high value by the intensifier piston 27 flows from the intensifier cylinder 24 to the hydraulic pressure regulating valve 34 and also to the second hydraulic magnetic valve 32. At that time, because there is a low back pressure on the oil flowing into the clamping cylinder 20, the oil flow is halted by the pressure regulating valve 34, and the oil flows only to the clamping cylinder 20 via the second magnetic valve 32, thus raising the second piston 21 in the clamping cylinder 20 against the bias of the second compression spring 22 to bring the second mold member 6 in contact with the first mold member 5. Thus the mold 7 has been closed.

Upon completion of the closing operation of the mold 7, a back pressure is developed on the oil to actuate the pressure regulating valve 34 so as to allow the oil to pass therethrough to the injection head cylinder 15. As a result, the first piston rod 16 is lowered against the bias of the first compression spring 17 to force the molten molding material out of the injection cylinder 3 into the mold 7. Prior to lowering of the first piston 16, the injection cylinder 3 is lowered to bring the injection nozzle 14 in contact with the first mold member 5.

When the lowering second piston rod 16 arrives at a predetermined position, the solenoid 33 of the second magnetic valve 32 is energized to stop the oil flowing to the clamping cylinder 20, thereby trapping pressurized oil thereby retaining the first and second mold members 5, 6 of the mold 7 in coupled position while the injected molding material is cooled to become hard. During that time, the injection cylinder 3 is raised to bring the injection nozzle 14 away from the first mold member 5.

In the meantime, the solenoid 29 of the first magnetic valve 28 is de-energized to reverse the direction of the air flow so as to retract the larger-diameter piston 26, together with the smaller-diameter intensifier piston 27, in the direction of the arrow A. This retraction causes the pressure of the oil in the intensifier cylinder 24 to become reduced so that the pressure regulating valve 34 assumes its original closed position. Then the first piston 16a of the injection head cylinder 15 is raised under the bias of the first compression spring 17, whereupon the oil in the injection head cylinder 15 flows to the intensifier cylinder 24. At that time, since there is no oil flow from the clamping cylinder 20, the oil from the oil pot 36 flows into the intensifier cylinder 24 via the second check valve 37 to make up the balance.

After the lapse of a predetermined cooling time, when the solenoid 33 of the second magnetic valve 32 is de-energized to render the second magnetic valve 32 to assume its original opened position, thus allowing the pressurized oil in the clamping cylinder 20 to flow to the intensifier cylinder 24 through the second magnetic valve 32 as the second piston 21 is lowered under the bias of the second compression spring 22.

However, at that time, since the intensifier cylinder 24 is filled with the oil, a portion of the oil from the clamping cylinder 20 flows through the inlet 38 into the oil pot 36 for storage therein. Thus a single cycle of the injection molding operation of the molding machine has been completed.

The magnetic valves and the pressure regulating valve each may have an oil-flow pipe for allowing the excessive oil to flow therethrough to the oil pot at the switching time of the valve.

For forming the top stops of a slide fastener, a suitable sensor may be provided in the feed path of a slide fastener chain and may be electrically connected with the solenoid 29 of the first magnetic valve 28 to energize the solenoid 29 when the slide fastener chain is placed in a predetermined position in the mold 7. Alternatively, the solenoid 29 may be energized by an independent switch to be operated by the workperson.

For de-energizing the solenoid 29, the lowermost position of the first piston rod 16 of the injection head cylinder 15 may be detected by a microswitch which then issues an "OFF" command signal.

The solenoid 33 of the second magnetic valve 32 is energized upon detection of the lowermost position of the first piston rod 16 of the injection head cylinder 15. After the lapse of a predetermined cooling time, an "OFF" command signal may be issued to the solenoid 33 by means of a timer.

According to the molding machine of the present invention, since a high oil pressure can be obtained from a pneumatic power source by the booster, it is possible to reduce the size and the cost of the molding machine. Further, because the injection head cylinder 15 and the clamping cylinder 20 are operated under high hydraulic pressure, an increased speed of injection can be achieved, thus reducing not only the size of the sprue L and runner R in the mold 7, but also the period of cooling time. Consequently, the saving of molding material and hence an improved rate of production can be achieved.

Although various minor modifications may be suggested by those versed in the art, it should be understood that I wish to embody within the scope of the patent warranted hereon, all such embodiments as reasonably and properly come within the scope of my contribution to the art.

What is claimed is:

1. An injection molding machine for small-sized articles of thermoplastic synthetic resin, comprising:
   (a) a support;
   (b) a mold supported on said support, said mold including a pair of first and second mold members jointly defining a mold cavity therebetween, said first mold member being fixed to said support, and said second mold member being movable toward and away from said first mold member;
   (c) an injection unit having an injection cylinder through which molding material is to be injected through said first mold member into said mold cavity;
   (d) a hydraulically pressurizable injection head cylinder supported on said support and operable on said injection cylinder for injecting the molding material into said mold cavity;
   (e) a hydraulically pressurizable clamping cylinder supported on said support and operable on said second mold member for opening and closing said mold; and
   (f) a booster operatively connected to both said injection head cylinder and said clamping cylinder for converting pneumatic pressure into high hydraulic pressure to actuate said injection head cylinder and said clamping cylinder in timed relation to each other.

2. An injection molding machine according to claim 1, said booster including a pneumatic cylinder, an intensifier cylinder containing a pressurized oil, a larger-diameter piston reciprocable in said pneumatic cylinder, and a smaller-diameter piston extending from said larger-diameter piston and reciprocable in said intensifier cylinder in response to the reciprocating movement of said larger-diameter piston.

3. An injection molding machine according to claim 2, further including: a first magnetic valve operatively connected to said pneumatic cylinder for converting flow-in of pressurized air to flow-out thereof and vice versa; a second magnetic valve operatively connected at opposite ends to said intensifier cylinder and to said clamping cylinder for converting flow-in of the pressurized oil to flow-in stoppage thereof and vice versa; and a pressure regulating valve operatively connected at opposite ends to said intensifier cylinder and said injection head cylinder for allowing the pressurized oil to flow through said pressure regulating valve into said clamping cylinder only when a back pressure of the oil is developed after said clamping cylinder is filled with the pressurized oil so as to fully close said mold.

4. An injection molding machine according to claim 3, wherein said first magnetic valve is a four-way magnetic valve, and said second magnetic valve is a two-way magnetic valve.

5. An injection molding machine according to claim 3, further including a first check valve operatively connected to opposite ends of said pressure regulating valve in parallel relation thereto for allowing the pressurized oil from said injection head cylinder to flow through said first check valve to said intensifier cylinder only when the pressure of the pressurized oil between said intensifier cylinder and said pressure regulating valve is below a predetermined value.

6. An injection molding machine according to claim 5, further including an oil pot connected to said booster for storing an amount of oil, and a second check valve connected at opposite end to said oil pot and to said intensifier cylinder for allowing the oil from said oil pot to flow to said intensifier cylinder only when the pressure of the pressurized oil between said intensifier cylinder and said second magnetic valve is below a predetermined value.

* * * * *